(12) United States Patent
Grell et al.

(10) Patent No.: US 8,464,037 B2
(45) Date of Patent: Jun. 11, 2013

(54) COMPUTER SYSTEM COMPRISING A SECURE BOOT MECHANISM ON THE BASIS OF SYMMETRIC KEY ENCRYPTION

(75) Inventors: Michael Grell, Dresden (DE); Ralf Findeisen, Dresden (DE); Frank Schuecke, Dresden (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1084 days.

(21) Appl. No.: 12/355,900

(22) Filed: Jan. 19, 2009

(65) Prior Publication Data

US 2009/0276617 A1 Nov. 5, 2009

(30) Foreign Application Priority Data

Apr. 30, 2008 (DE) .................. 10 2008 021 567

(51) Int. Cl.
*G06F 9/00* (2006.01)
*G06F 15/177* (2006.01)

(52) U.S. Cl.
USPC ............. 713/2; 713/1; 713/176; 713/189

(58) Field of Classification Search
USPC ................................ 713/1, 2, 176, 189
See application file for complete search history.

(56) References Cited

U.S. PATENT DOCUMENTS

| | | | | |
|---|---|---|---|---|
| 6,389,532 B1* | 5/2002 | Gupta et al. | ........... | 713/163 |
| 6,539,456 B2* | 3/2003 | Stewart | ............. | 711/113 |
| 6,892,297 B1* | 5/2005 | Aguilar et al. | ........... | 713/2 |
| 6,959,331 B1* | 10/2005 | Traversat et al. | ........... | 709/222 |
| 7,036,023 B2* | 4/2006 | Fries et al. | ........... | 726/21 |
| 7,036,040 B2* | 4/2006 | Nicholson et al. | ........... | 714/6.31 |
| 7,073,064 B1* | 7/2006 | Angelo et al. | ........... | 713/176 |
| 7,103,782 B1* | 9/2006 | Tugenberg et al. | ........... | 713/194 |
| 7,174,457 B1* | 2/2007 | England et al. | ........... | 713/168 |
| 7,343,496 B1* | 3/2008 | Hsiang et al. | ........... | 713/194 |
| 7,454,653 B2* | 11/2008 | Nicholson et al. | ........... | 714/47.2 |
| 7,457,412 B2* | 11/2008 | England et al. | ........... | 380/44 |
| 7,546,447 B2* | 6/2009 | Chen et al. | ........... | 713/1 |
| 7,676,840 B2* | 3/2010 | Morais et al. | ........... | 726/21 |
| 7,770,165 B2* | 8/2010 | Olson et al. | ........... | 717/168 |

(Continued)

FOREIGN PATENT DOCUMENTS

| EP | 1659472 A1 | 5/2006 |
|---|---|---|
| WO | WO 2006/086301 A1 | 8/2006 |

OTHER PUBLICATIONS

Translation of Official Communication from German Patent Office for German Patent Application No. 10 2008 021 567.8-53 dated Nov. 12, 2008.

(Continued)

*Primary Examiner* — Jaweed A Abbaszadeh
(74) *Attorney, Agent, or Firm* — Williams, Morgan & Amerson, P.C.

(57) ABSTRACT

A CPU, a computer system and a secure boot mechanism are provided in which a symmetric encryption key may be incorporated into a non-volatile memory area of the CPU core, thereby substantially avoiding any tampering of the encryption key by external sources. Moreover, pre-boot information may be internally stored in the CPU and may be retrieved upon a reset or power-on event in order to verify a signed boot information on the basis of the internal symmetric encryption key. Furthermore, the BIOS information may be efficiently updated by generating a signature using the internal encryption key.

21 Claims, 7 Drawing Sheets

U.S. PATENT DOCUMENTS

| | | | | |
|---|---|---|---|---|
| 7,937,575 B2 * | 5/2011 | Hajji et al. | | 713/1 |
| 7,962,737 B2 * | 6/2011 | Lo | | 713/2 |
| 8,006,095 B2 * | 8/2011 | Berenbaum et al. | | 713/180 |
| 2001/0007131 A1 | 7/2001 | Galasso et al. | | |
| 2002/0078338 A1 * | 6/2002 | Lay et al. | | 713/2 |
| 2002/0099949 A1 * | 7/2002 | Fries et al. | | 713/200 |
| 2003/0014663 A1 * | 1/2003 | Sormunen et al. | | 713/200 |
| 2003/0229777 A1 * | 12/2003 | Morais et al. | | 713/2 |
| 2005/0021968 A1 * | 1/2005 | Zimmer et al. | | 713/176 |
| 2005/0076226 A1 | 4/2005 | Boivie et al. | | |
| 2005/0138270 A1 * | 6/2005 | Morais et al. | | 711/102 |
| 2005/0138409 A1 * | 6/2005 | Sheriff et al. | | 713/200 |
| 2005/0216753 A1 * | 9/2005 | Dailey et al. | | 713/191 |
| 2006/0015748 A1 * | 1/2006 | Goto et al. | | 713/190 |
| 2006/0026693 A1 * | 2/2006 | Bade et al. | | 726/34 |
| 2006/0112266 A1 * | 5/2006 | Little et al. | | 713/161 |
| 2007/0055872 A1 * | 3/2007 | Soga et al. | | 713/168 |
| 2007/0113067 A1 * | 5/2007 | Oh et al. | | 713/2 |
| 2007/0192610 A1 | 8/2007 | Chun et al. | | |
| 2007/0198851 A1 * | 8/2007 | Goto | | 713/187 |
| 2008/0016348 A1 * | 1/2008 | Craft et al. | | 713/168 |
| 2008/0108325 A1 * | 5/2008 | Ahn et al. | | 455/411 |
| 2008/0159541 A1 * | 7/2008 | Kumar et al. | | 380/278 |
| 2009/0055656 A1 * | 2/2009 | Mersh | | 713/187 |
| 2009/0063865 A1 * | 3/2009 | Berenbaum et al. | | 713/180 |
| 2009/0086981 A1 * | 4/2009 | Kumar et al. | | 380/285 |
| 2009/0172639 A1 * | 7/2009 | Natu et al. | | 717/120 |
| 2009/0193211 A1 * | 7/2009 | Hu et al. | | 711/163 |
| 2009/0241103 A1 * | 9/2009 | Pennisi et al. | | 717/173 |
| 2010/0082955 A1 * | 4/2010 | Chhabra et al. | | 713/1 |

OTHER PUBLICATIONS

PCT Search Report and Written Opinion from PCT/US2009/001289 dated Aug. 3, 2009.

* cited by examiner

COMPUTER SYSTEM COMPRISING A SECURE BOOT MECHANISM ON THE BASIS OF SYMMETRIC KEY ENCRYPTION

BACKGROUND

1. Field of the Disclosure

The present disclosure generally relates to the field of computer systems of enhanced integrity and corresponding mechanisms implemented therein, which may enable the provision of enhanced security standards requiring a secure boot mechanism.

2. Description of the Related Art

The widespread use of computer systems has led to a significant increase of information processing on the basis of electronic computer systems, thereby involving the creation, distribution and processing of very large amounts of digital data. With the increasing capabilities of computer systems in view of data storage capacity and increased processing speed, the reproduction of large data sets, such as audio data, movies and the like, has become available for an increasing number of persons and is frequently practiced despite any protective rights, which may be associated with many of the data provided in electronic form. Thus, significant economic damage may be created by the illegal copying, storage and redistribution of electronic data. Furthermore, the distribution of application programs over widespread networks, such as the internet, may also provide the possibility of distributing malicious software applications, which may in turn be used for manipulating data and/or tampering with the configuration of a respective computer platform. For example, significant damage may be created in private environments, and in particular in the industry, by introducing software applications which may, for instance, manipulate software files such as stored data, communicate information via the internet without knowledge of the actual user of the platform, start a denial of service attack, thereby possibly rendering the platform to be no longer usable for a dedicated application requiring a specific status of the platform, and the like.

For these reasons, great efforts are being made in developing mechanisms for enhancing integrity of computer platforms to reduce the probability of "successful" external attacks, for instance in the form of malicious software, denial of service attacks, sniffing, spoofing and the like, and also to enhance data integrity with respect to internal manipulations of the computer platform. For example, a plurality of encryption techniques are available, such as symmetric or asymmetric encryption/decryption techniques, which enable the exchange of data with a high degree of resistance against the tampering of data by a third party during the transmission and storage of data. In asymmetric encryption techniques, a pair of a private key and a public key may be used for encrypting data by means of one of the keys and deciphering the data by using the other key, wherein one of the keys may be publicly accessible. In symmetric key encryption techniques, a unique key is used for both the encryption and decryption of data, wherein access to the unique key may have to restricted to authorized parties. Although these techniques may provide enhanced integrity in data communication and data storage, the actual configuration of a computer platform under consideration may still provide the possibility of a plurality of attacks, in particular, as many applications intended for increasing computer security may rely on a trusted platform configuration.

A trusted computer platform may be considered as a computer system in which the hardware configuration as well as the software applications may be assumed to be in a dedicated configuration. However, a secure platform configuration may be established only be establishing a "chain" of trusted platform levels, wherein each subsequent level may be initialized by the preceding level only if the integrity of the subsequent level has been verified. Hence, the integrity at system level may be preserved through a chain of integrity verifications, wherein a root of the chain of verification steps may have to be provided with a high degree of tamper resistance so as to also accomplish a high confidence with respect to integrity of the system after initializing the highest level, i.e., the level of user applications.

In a typical computer platform, the initialization of the system requires various degrees of abstraction, for example, with respect to initializing the central processing unit (CPU), initializing the system memory, which is typically provided externally to the CPU, loading an operating system into the system memory from an external mass storage device, and finally executing user applications. Thus, in view of enhancing the overall integrity of the system as a whole, it may not be sufficient to assume that the various system activities prior to loading the operating system may be considered to be secure so as to rely on the integrity of the operating system and the user application, since the operating system may be invoked by a "mistrusted" process, thereby providing the opportunity of manipulating the basic platform configuration by modifying hardware and software components. Hence, the process of initializing the various hardware components of the computer system, such as the system memory and the execution of the instructions contained therein for initializing the higher system levels, which may also be referred to as boot strapping or booting, may have to be incorporated into the chain of trust to provide enhanced overall system integrity.

A typical start sequence for initializing a computer system after applying power or after a reset event causes a "power on self-test" of the CPU, wherein the processor also starts execution of instructions at a dedicated entry address that is indicated by the processor's reset vector. That is, after an initial processor self-test, the execution of instructions may start at the entry point, which may typically be an address of a software routine, frequently referred to as BIOS (basic input/output system), which may be stored in a dedicated external non-volatile memory of the computer platform. Under the control of the BIOS, the remaining self-test may be performed and the hardware configuration of the platform may be determined or "measured." Thereafter, a search for a bootable device may be performed, such as a mass storage device, for instance, the hard disk of the computer system, a disk, a CD-ROM, an extension card and the like, from which a primary boot block may be loaded into the system memory, wherein control is then passed to the primary boot block, which may load an operating system into the system memory.

Although great efforts have been made in also enhancing security of the entire boot process, it is difficult to provide a reliable core root of trust for measurement (CRTM) for the boot process, for example, in view of platform modifications such as replacement of the non-volatile memory chip including the BIOS software, since a corresponding chip replacement may therefore interrupt the chain of trust, thereby also rendering all subsequent verification steps as not trustworthy. Hence, great efforts are made in providing a secure boot mechanism, wherein, however, frequently a trust center has to be used, thereby requiring comprehensive resources, whereas flexibility in updating the BIOS software may be reduced.

The present disclosure is directed to various devices and methods that may avoid, or at least reduce, the effects of one or more of the problems identified above.

SUMMARY OF THE DISCLOSURE

The following presents a simplified summary of the disclosure in order to provide a basic understanding of some aspects disclosed herein. This summary is not an exhaustive overview, and it is not intended to identify key or critical elements of the invention or to delineate the scope of the invention. Its sole purpose is to present some concepts in a simplified form as a prelude to the more detailed description that is discussed later.

Generally, the present disclosure relates to devices and mechanisms for enhancing integrity of computer systems by establishing a static root of trust for measurement in that a certain set of data is provided that may include executable instructions and data values which, if a secure boot mechanism is enabled, will be accessed by the central processing unit without providing the possibility of circumventing access to the dedicated data set so that a defined root for the initialization of the platform is obtained. The set of data is implemented in such a manner that a high level of resistance against any attacks for manipulation may be achieved. During execution of instructions contained in the set of data, the execution may not be changed or interrupted, thereby providing a high degree of integrity of the data which may thus be considered as a pre-boot set of instructions and data values. Since the processing of the instructions of the pre-boot data is mandatory at the start-up time of the system under consideration, a chain of trusted software may be started, thereby enabling a high degree of system integrity since the dedicated state of pre-boot data represents the static core root for the chain of subsequent verification steps. According to the principles disclosed herein, an encryption key may also be stored in the internal non-volatile memory, which may be accessed during the pre-boot phase on the basis of the secure instruction set in order to verify the integrity of at least a portion of signed boot data, the signature of which may also be generated on the basis of the encryption key stored in the non-volatile memory. Hence, prior to actually initializing the system memory, the boot data, or at least a portion thereof, may be verified by determining a signature of the boot data and comparing the currently determined signature with the stored signature of the boot data. Consequently, using a unique symmetric encryption key for any desired platform results in a higher level of protection and also makes the BIOS non-interchangeable. This may be accomplished without involving a trust center and may avoid general attacks which might concern a plurality of computer platforms, while at the same time a scaleable degree of security may be provided, wherein the "multiplicity" with which the unique symmetric encryption key is used may determine the "granularity" of the degree of security. In some illustrative aspects disclosed herein, the unique encryption key stored in the non-volatile internal memory may also be used for creating a signature upon updating of the system BIOS, thereby further enhancing the overall flexibility of the trusted platform mechanism disclosed herein. Since the pre-boot data set and the unique symmetric encryption key may be maintained in a non-volatile internal memory, for instance in the CPU core itself, a high degree of integrity of the encryption key is achieved while substantially avoiding any attacks, for instance, with respect to replacing BIOS chips and the like.

One illustrative method disclosed herein relates to booting of a computer system. The method comprises, upon a power-on event or a reset event, executing instructions stored in an internal non-volatile memory area of a central processing unit, wherein the internal non-volatile memory area contains an encryption key. The method further comprises determining a current signature of at least a signed portion of boot data, wherein the signed portion of boot data concerns a stored signature of the portion of boot data wherein the stored signature is created by applying the encryption key. The method further comprises executing boot instructions contained in the signed portion of boot data when the current signature and the stored signature are identical.

A further illustrative method disclosed herein relates to the booting of a computer system. The method comprises, upon a power-up event or a reset event, accessing an internal non-volatile memory of a central processing unit, wherein the internal non-volatile memory contains pre-boot instructions and data values for initializing an internal volatile memory of the central processing unit and for verifying the integrity of at least a portion of boot instructions and boot data values. The method further comprises loading the at least a portion of the boot instructions and boot data values from a non-volatile memory into the internal volatile memory by executing the pre-boot instructions. Furthermore, the method comprises verifying an integrity of the at least a portion of the boot instructions and boot data values by using an encryption key stored in the internal non-volatile memory and using a signature associated with the at least a portion of the boot instructions and boot data values, wherein the signature is formed on the basis of the encryption key. Additionally, the method comprises determining whether an upgrade version of the boot instructions and boot data values is available when the integrity of the at least a portion of the boot instructions and boot data values has been successfully verified. Finally, the method comprises generating a signature of the upgrade version by using the encryption key when an upgrade version is available.

An illustrative central processing unit (CPU) disclosed herein comprises a substrate having formed thereon circuit elements defining a CPU core, a volatile random access memory, a non-volatile memory and a bus system for connecting the CPU core, the volatile random access memory and the non-volatile memory. The CPU further comprises pre-boot information stored in the non-volatile memory, wherein the pre-boot information includes instructions executable by the CPU core which also includes a symmetric encryption key for verifying at least a portion of a boot routine that is assigned by applying the symmetric encryption key.

One illustrative computer system disclosed herein comprises a central processing unit as specified above and a non-volatile boot memory configured to hold at least a first boot routine and a second boot routine.

BRIEF DESCRIPTION OF THE DRAWINGS

The disclosure may be understood by reference to the following description taken in conjunction with the accompanying drawings, in which like reference numerals identify like elements, and in which.

Figure 1A:
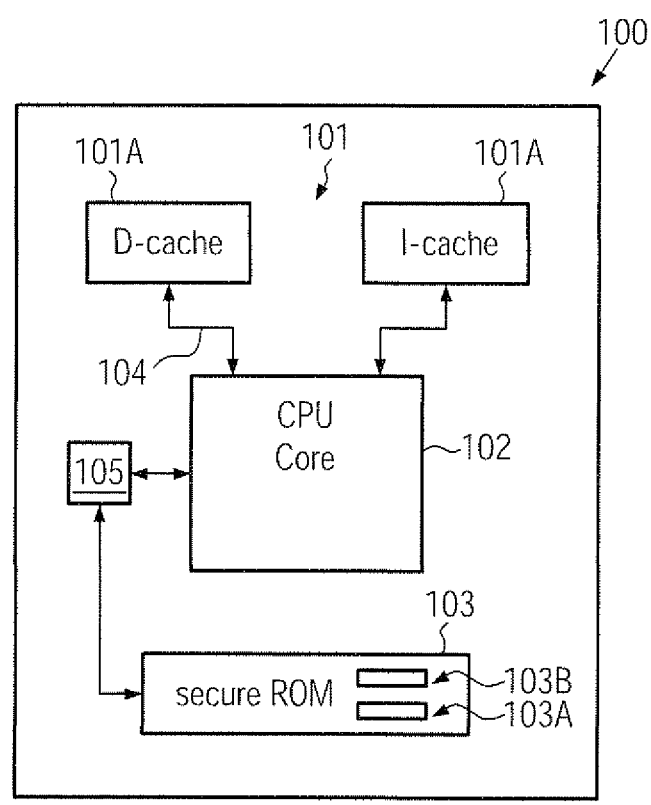
FIG. 1a schematically illustrates a central processing unit (CPU) including a random access memory (CACHE), a CPU core and a non-volatile memory including pre-boot information and a symmetric encryption key, according to illustrative embodiments.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present disclosure provides a system and a mechanism for executing—at start-up or reset or any other operational state requiring an initialization of the system—instructions stored in a memory area that may not be accessed after completing a verification phase of at least a portion of boot instructions. For this purpose, the verification process may be based on a symmetric encryption key also stored in a memory area that may be locked in view of any operational state of the CPU except for start-up or reset events. For example, the instructions and the symmetric encryption key may be stored in a non-volatile memory forming a part of a central processing unit, thereby significantly reducing the possibility of manipulating the data included in the non-volatile memory. Consequently, the contents of the non-volatile memory may be used as a static root of trust for measurement during the initialization of the CPU and the entire computer system by ensuring that, upon power-up or reset of the CPU, the first instruction is fetched from the non-volatile memory. Thus, the set of data contained therein may serve as a pre-boot or pre-BIOS component, which may enable the initialization of further system components, such as an internal random access memory, which may be used for storing operational data like variables and stack and instructions for running a portion of the BIOS software. For instance, the data cache as part of the random access memory area and an instruction cache may be initialized by the pre-boot data of the internal non-volatile memory, thereby substantially avoiding the possibility of external access to data contained therein during the initialization process. That is, the random access memory area, i.e., the data cache and the instruction cache, are CPU-internal components so that unwanted manipulation thereof may be very difficult, in particular as the external system memory is not initialized, as long as at least a portion of the BIOS software has been verified. Depending on the storage capacity of the random access memory, the BIOS routine may be divided into two or more portions such that verification of one or more signatures in view of BIOS integrity may be performed in the random access memory for a first portion that is configured to have a size to fit into the cache memory. Thus, this portion of the boot information may, after verification on the basis of the symmetric encryption key, be executed, for instance, directly from the random access memory, thereby substantially avoiding any manipulation process of verifying the first portion of the boot instructions. Thus, after verification of the signature of the first portion by applying the stored symmetric encryption key, flow control may be passed to the verified portion and the further boot process may be continued by initializing the system memory and copying the remaining boot information, while also verifying integrity of the further boot information, for instance, on the basis of hash algorithms wherein, however, the generation of a signature may not be required, due to the chain of trust created to the preceding verification on the basis of a signature and the stored symmetric encryption key. Consequently, the data, i.e., the instructions and data values including the symmetric encryption key contained in a non-volatile internal memory area provided as an integral part of the CPU, may be used as a static core root of trust for measurement, thereby providing a computer platform in which a tamper-resistant system hardware and software configuration may be realized. In particular, in view of attacks, such as replacement of the BIOS chip, the mechanism of embodiments disclosed herein may provide enhanced security for typical practical applications, which use the platform in the context of financial transactions or digital rights management, which may be based on the requirement of a trustworthy computer platform. Additionally, using a symmetric encryption key mechanism provides security without having to rely on a trust center for handling private and public keys, as is the case in asymmetric encryption techniques, thereby significantly reducing the overall complexity. At the same time, the desired degree of security may be determined by restricting the usage of the unique encryption key to a specified type of central processing unit so that manipulations or loss of secrecy for one unique encryption key may not affect other CPUs that have been fabricated on the basis of a different unique encryption key. Moreover, illustrative embodiments disclosed herein may provide an efficient technique for updating the BIOS software using the stored encryption key for generating a respective signature, which may then be added to the upgrade version of the BIOS software, which may then be verified upon booting the computer system on the basis of the newly created signature and the stored encryption key.

FIG. 1a schematically illustrates a central processing unit (CPU) 100 according to illustrative embodiments in which a core root of trust for measurement (CRTM) may be implemented with a high degree of tamper resistance. The CPU 100 may comprise a CPU core 102 which may include components for data processing, such as for performing arithmetic operations, logic operations and the like. The CPU core 102 may be functionally connected to a random access memory 101, which may comprise a plurality of static RAM cells and the like, corresponding to the overall configuration of the CPU 100. In one illustrative embodiment, the RAM 101 may comprise a first memory portion, also indicated as data cache 101A, and a second portion indicated as instruction cache 101B. For example, the RAM 101 may be implemented in a fast memory technology so as to enhance the overall performance of the CPU 100, as is typically required in sophisticated applications. It should be appreciated, however, that any appropriate memory technology may be used for the memory 101, as long as direct control of the memory 101 via the CPU core 102 may be accomplished without the possibility of external access during the initialization of the CPU 100. The CPU 100 may further comprise a non-volatile memory 103, which may be provided in any appropriate memory technology, for instance in the form of a flash memory or a read-only memory technique, which may not enable external access for modifying the contents of the memory 103. Hence, the memory 103 may be considered as a secure memory area, the contents of which may therefore represent a static root of trust. For this purpose, a set of data 103A, which is to be understood as instructions executable by the CPU core 102 and data values representing operands and the like of the instructions, may be provided, at least in a portion of the memory 103, which may not be overwritten with new data once the respective portion of the memory 103 is programmed. Additionally, the memory 103 may contain a symmetric encryption key 103B, which may also be used for signing a portion of boot information that may initially be used for initializing a computer system comprising the CPU 100. It should be appreciated that the memory 103 may not necessarily represent a continuous memory area, a portion of which may contain the data set 103A and a portion of which may contain the encryption key 103B, but may be implemented in any appropriate manner, for instance as substantially independent components of the CPU 100, as long as external access of the data set 103A and the encryption key 103B may be suppressed after a certain phase of the initialization process. Furthermore, the CPU 100 may comprise a lock mechanism 105, which may be configured such that access of the CPU core 102 to the memory 103, or at least the encryption key 103B, may be enabled upon power-on or a reset event only, while disabling the memory 103, which may be accomplished by instructing the lock mechanism 105 during the boot process after verification of at least a portion of the boot information. For instance, the lock mechanism 105 may comprise circuitry for shutting down supply energy for the memory 103 and also for the mechanism 105 itself, thereby locking the mechanism 105 and also the memory 103 non-responsive to any accesses performed after a request for "locking" the memory 103 or at least a portion thereof including the symmetric encryption key 103B. On the other hand, enabling the memory 103, for instance by providing power to the lock mechanism 105, may be associated with a power-up or a reset event only. It should be appreciated, however, that the lock mechanism 105 may have any other appropriate configuration in which external access to the encryption key 103B may be restricted to an operational status of the CPU 100 in which, after reset or power-on, a corresponding instruction for locking the encryption key 103B has not yet been executed.

The internal components of the CPU 100, that is, the memory 103, the CPU core 102, the internal RAM 101 and the lock mechanism 105, may be interconnected by means of a bus system 104 such that, upon power-up or reset, a jump to a specified address of the memory 103 is performed. Consequently, a "hard-wired" target for a reset vector of the CPU core 102 may be provided which ensures that execution of instructions may start from the memory 103, at least for a power-up event or a reset event.

It should be appreciated that the CPU 100 may be formed on the basis of sophisticated semiconductor manufacturing techniques in which an appropriate carrier material, such as a semiconductor substrate and the like, may receive a plurality of circuit elements formed on the basis of a technology under consideration, such as CMOS processes and the like, in which transistor elements, capacitors, resistors and the like may be formed in accordance with specific device architecture for the CPU 100. In the embodiments illustrated herein, the various components of the CPU 100 may therefore be formed on a common substrate during a common manufacturing process flow, thereby providing the memory 101 and 103 as an internal or integral component of the device 100. For example, respective manufacturing techniques are well established in which volatile and fast memory cells may be formed together with non-volatile memory cells and high performance logic gates, as may be required in the CPU core 102. Additionally, appropriate mechanisms may be provided such that, after programming the memory 103 or at least a portion thereof, including the data set 103A and the symmetric unique encryption key 103B, further access may be prevented so as to provide a protected environment for the data set 103A and the encryption key 103B.

Figure 1B:
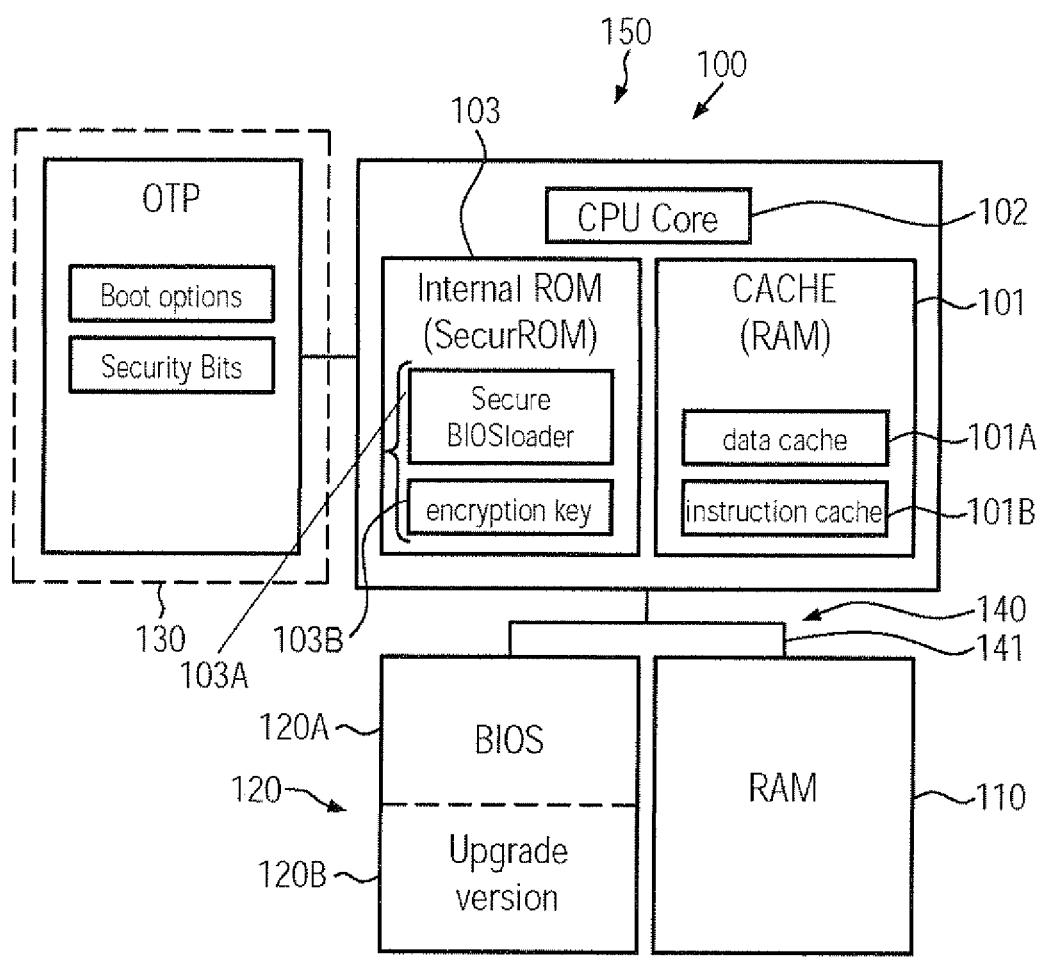
FIG. 1b schematically illustrates a computer system including a CPU with pre-boot information and an encryption key, according to other illustrative embodiments.

FIG. 1b schematically illustrates a computer system 150 comprising the CPU 100 providing the protected environment for the data set 103A and the encryption key 103B, as previously explained, wherein, in the embodiment shown, the CPU 100 may comprise the random access memory 101 in the form of the data cache 101A and the instruction cache 101B, which may have a size of, for example, 64 Kb to accommodate a portion of boot information and to act as a "system RAM" when performing instructions of the data set 103A. Similarly, the instruction cache 101B may be provided with the size of 64 Kb, wherein it should be appreciated that any other appropriate memory size may be used that is compatible with the size of a respective portion of boot information that is to be performed from the memory 101 during a verification process. Also, the internal non-volatile memory 103 may be provided with any appropriate size and configuration so as to be compatible with the requirements for the data 103A and the symmetric encryption key 103B. For example, the set of data 103A may comprise instructions and data values representing a secure load routine for loading a respective portion of boot information into the internal memory 101 for performing a verification process.

The computer system 150 may further comprise a system memory 110, for instance in the form of any appropriate memory device including random access memory cells, such as dynamic RAM cells and the like. The size of the system memory 110 may be adapted to the requirements of the system 150 in view of performance and storage capacity. Furthermore, the system 150 may comprise a non-volatile memory 120, such as a flash memory and the like, which may include information, also referred to as BIOS information, at least a portion of which may be a signed portion, that is, a signed portion may comprise a signature obtained on the basis of an appropriate hash algorithm in combination with an encryption mechanism using the symmetric encryption key 103B as stored in the memory 103. In one illustrative embodiment, the non-volatile memory 120 may contain the boot information divided into two portions, wherein a first portion may comprise data and instructions for initializing other system components, such as the system memory 110 for accommodating the second portion of boot information and executing the second portion once the first portion has been verified on the basis of the protected environment provided by the CPU 100. The first portion may also be referred to as an initial boot loader (IBL), which may represent the signed portion of the boot information contained in the memory 120.

In some illustrative embodiments, the non-volatile memory 120 may comprise a first portion 120A for containing a first BIOS version that may be accessed upon initializing the system 150, which may be indicated as an enabled version of BIOS information contained in the memory 120. Moreover, a second portion 120B may be provided, which may contain a second BIOS version, such as an upgrade version, and which may be in a non-enabled state, thereby requiring validation and the creation of a signature on the basis of the stored encryption key 103B during an initialization phase, as will be described later on in more detail. Consequently, the memory 120 may have a sufficient capacity for holding at least two BIOS versions, thereby providing the possibility of efficiently updating the BIOS information for the system 150 while nevertheless providing enhanced security of the update process, as will be described later on.

The computer system 150 may further comprise an interface system 140 configured to operatively connect the system memory 110 and the non-volatile memory 120 with the CPU 100. In one illustrative embodiment, the system 150 may further comprise a one-time programmable memory 130, which may include platform-specific information, for instance about boot sources and related parameters. For instance, as shown, the one-time programmable memory 130 may comprise information concerning boot options in order to indicate to the CPU 100 whether to boot from the internal memory 103 or not. For example, security bits may provided in the memory 130 including a respective bit that determines where the initial instruction fetch of the CPU 100 after reset is rooted to. For example, with this bit set to "1", execution may be passed to the internal memory 103, thereby enabling the secure boot processing. It should be appreciated that, in other illustrative embodiments, the one-time programmable memory 130 may be omitted or may be provided so as to include other information controlling the secure boot processing during development and actual applications.

Figure 1C:
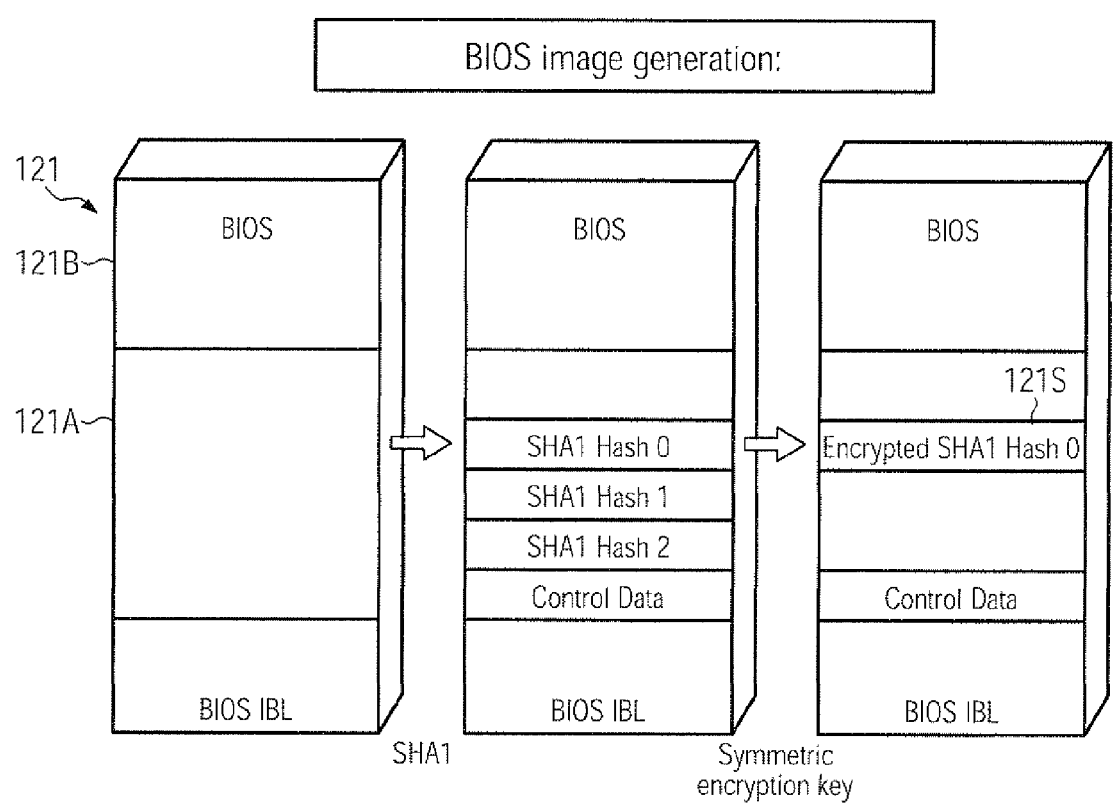
FIG. 1c schematically illustrates a process for verifying a portion of BIOS data, also referred to as initial BIOS loader (IBL), on the basis of a symmetric encryption mechanism, according to illustrative embodiments.

FIG. 1c schematically illustrates the configuration of boot information 121 that may be stored in the non-volatile memory 120, for instance in one of the portions 120A, 120B, as an "enabled" version of boot information contained therein. In the embodiment shown in FIG. 1c, the boot information 121, which may also be referred to as BIOS, may comprise a first portion 121A which may represent a set of data including instructions and data values having a size so as to be compatible with the size of the memory 101, as previously explained. For example, for the above-given exemplary values of 64 Kb for each of the RAM areas 101A, 101B, a maximum size of the portion 121A may be restricted to be approximately 32 Kb. It should be appreciated, however, that any other appropriate size for the portion 121A may be applied, depending on the available amount of storage within the RAM 101. It should further be appreciated that providing the portion 121A may be necessary for boot information 121 which exceeds the size of the memory 101, so that the entire boot processing may not be performed on the basis of the memory 101, since typical boot routines may have a size of several hundred kilobytes and more. In other cases, when sufficient storage space may be available in the CPU 100, the boot information 121 as a whole may be used during the secure boot processing, as will be explained later on in more detail.

Thus, if the portion 121A may be provided, as shown in FIG. 1c, this portion may serve as an initial BIOS loader (IBL) for a second portion 121B, wherein the first portion 121A may also contain a hash value obtained over the portion 121B. The hash value for the portion 121B may also be protected by a signature contained in the portion 121A obtained from a hash value generated over the first portion 121A, which may be encrypted by the encryption key 103B. Thus, an encryption of the hash value of the second portion may not be necessary. The signature of the hash value for the portion 121A may be used for verifying the portion 121A during a secure boot processing. The portion 121A may, therefore, be contained in instructions for performing necessary platform initialization actions, such as initialization of a memory controller 141 and the like, followed by the shadowing of the portion 121B from the memory 120, i.e., from one of the portions 120A, 120B, into the initialized system memory 110. Thus, after storing the portion 121A, 121B, the respective hash values may be created and may be added to the portion 121A, which may then, for an initial version of the BIOS information 121, be encrypted by a version of the symmetric encryption key 103B. The corresponding signature obtained by applying the key 103B may also be added to the portion 121A, as shown at the right-hand side of FIG. 1c.

Figure 1D:
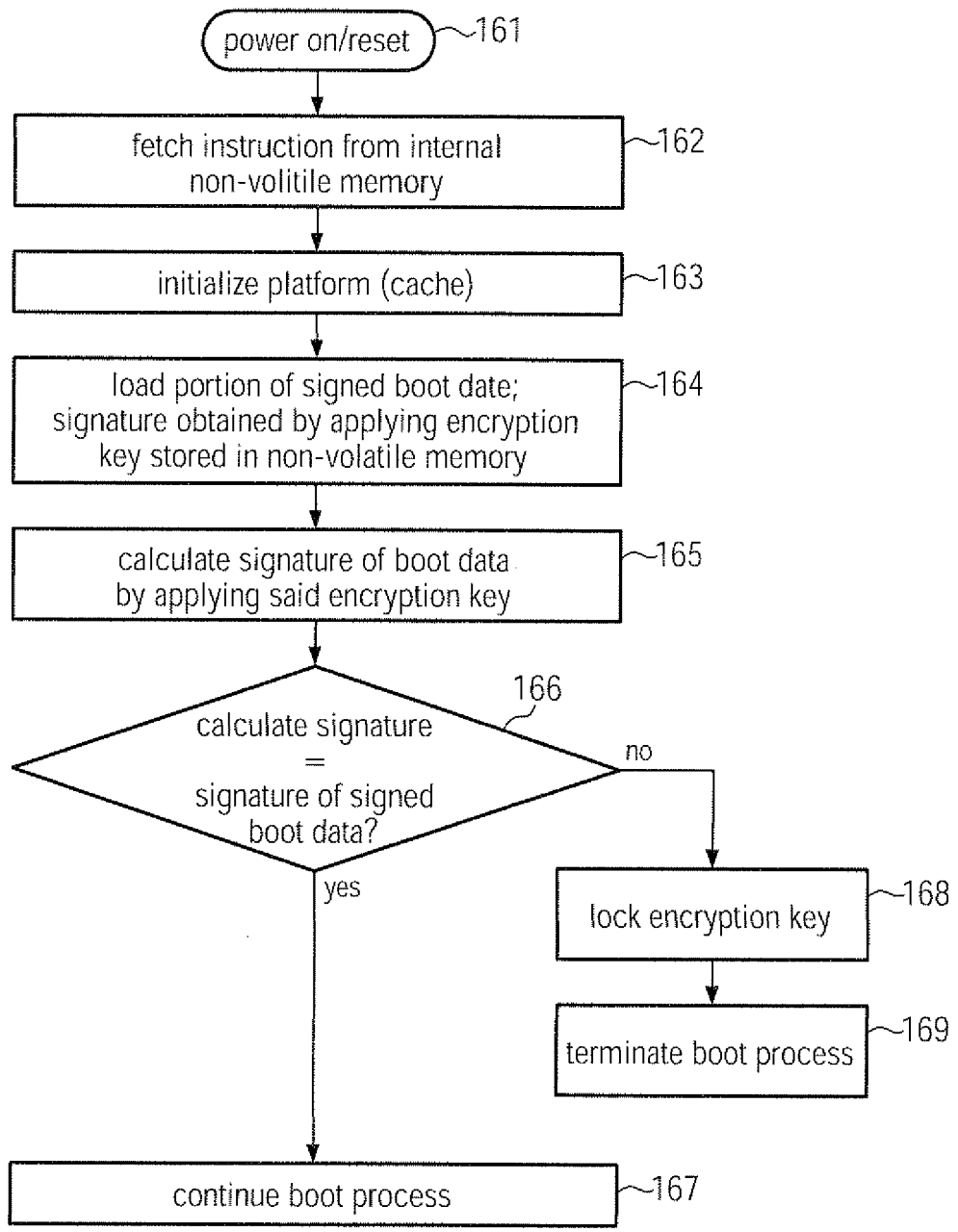
FIG. 1d schematically illustrates a flow diagram for a method of verifying integrity of boot data instructions and values, according to still further illustrative embodiments.

FIG. 1d schematically illustrates a sequence for verifying the signature 121S contained in the portion 121A, which may be performed on the basis of the data set 103A and the encryption key 103B during start-up or reset of the system 150. The verification may be accomplished on the basis of any appropriate encryption algorithm using the symmetric key 103B, wherein the initially created hash value, such as hash 0, obtained over the portion 121A, which may include respective hash values for the portion 121B, may be used for generating the signature 121S by applying the key 103B. The initially created hash value for the portion 121A may then be compared to a respective hash value obtained by applying the appropriate hash algorithm over the portion 121A that is copied into the RAM memory 101. The portion 121A may be considered as verified if a signature generated by applying the key 103B to a calculated hash value match with the signature 121S contained in the portion 121A.

In view of implementing the system 150 as a secure platform, a static root of trust may have to be implemented to enable a secure start-up of an operating system after power-up or reset of the computer system 150. For this purpose, a defined execution of the trusted BIOS information 121 may be accomplished by verifying at least the portion 121A on the basis of the trusted set of data 103A and the encryption key 103B, which are substantially resistant against any external manipulation. Thus, each time the system 150 may be activated by using a secure boot process, thereby enabling integrity of the entire boot process and trusted initialization of an operating system, which in turn may be used for performing security sensitive applications. On the other hand, if the integrity check may fail, for instance, during verifying the portions 121A or 121B, an appropriate policy may be applied, for instance the boot process may be terminated or services provided by the system 150 may be limited. Thus, the secure boot architecture disclosed herein may protect against "class breaks," which are to be understood as attacks that will work against every instance of a given security system. For example, a piece of software generated by an external source may be considered as class break, which may be easy to install and enable circumvention of security measures, thereby enabling unauthorized use of the platform. In digital rights management (DRM) environments, a class break may already be given when the DRM protected data file may be broken once, thereby enabling a redistribution of the unprotected file. Consequently, the mechanisms and systems disclosed herein may provide enhanced security with respect to class breaks since a protected environment may be obtained on the basis of an integral portion within the CPU itself, thereby requiring manipulation of the CPU itself, wherein, for instance, the revealing of the encryption key 103B may only concern respective CPUs into which this version of the encryption key 103B has been incorporated during the production process, while, however, other products manufactured on the basis of a different encryption key may nevertheless provide a secure platform.

In step 161, the system may be reset or power may be supplied thereto or any other event may occur that may require a secure boot processing. Consequently, an appropriate self-test may be performed by the CPU core 102 and respective components, such as registers and the like, may be initialized. It should be appreciated that, in some embodiments, a secure boot processing may not be enabled in an operating state in which the operating system may stay in control of the system 150. In step 162, the first instruction is fetched from the internal non-volatile memory 103, which may be accomplished by mapping the internal memory 103 to the corresponding reset vector address. Consequently, the CPU 100 starts execution on the basis of the secure data set 103A in any instances in which a jump to the reset vector is caused by an external event. In step 163, the internal random access memory 101 may be initialized, caused by the execution of the instructions contained in the data set 103A. In step 164, at least a portion of the boot information 121, for instance the portion 121A, including the signature 121S thereof, may be loaded into the internal random access memory 101. As previously explained, the signature 121S has been generated by applying the symmetric encryption key 103B. In step 165, a signature of the boot data in the memory 101, for instance the portion 121A, is generated by, for instance, calculating a respective hash value, as previously explained, and applying the encryption key 103B by accessing the memory 103.

In step 166, the currently calculated signature is compared with the signature 121S and, if both values match, the process flow advances to step 167 in which the boot process may be continued, for instance, by initializing the system memory and verifying the rest of the boot information 121. In the verification phase in step 166, the encryption key 103B is locked in step 168, for instance by disabling a respective portion of the memory 103 via the lock mechanism 105, as previously explained. Next, in step 169, the boot process may be terminated, which may include, for instance, an indication that an invalid BIOS information 121 is present in the internal memory 120.

Figure 1E:
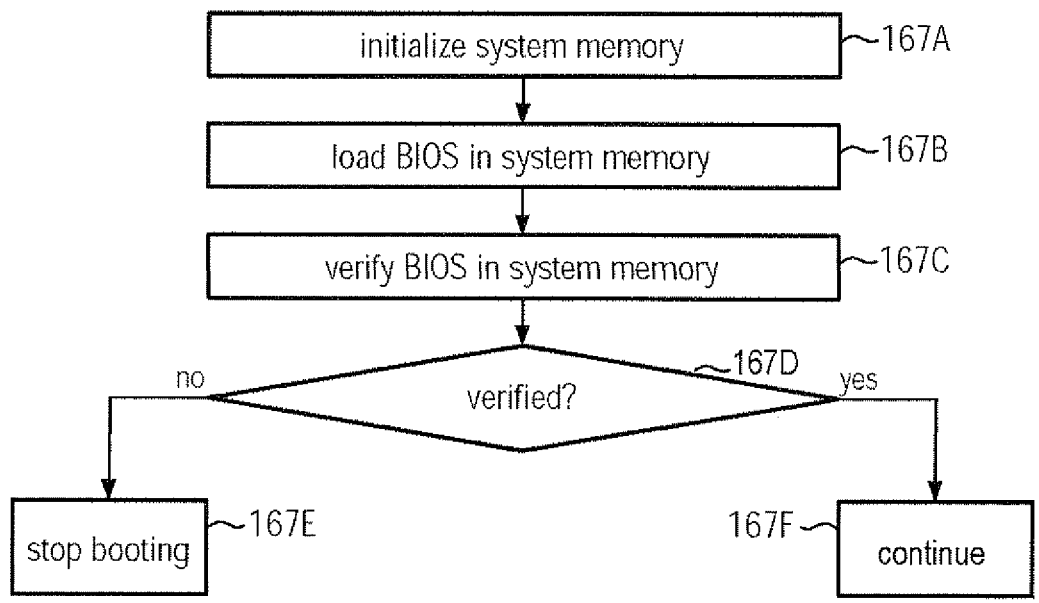
FIG. 1e schematically illustrates a flow diagram of a method for verifying integrity of BIOS data and generating a signature for an upgrade version of BIOS data, according to still further illustrative embodiments.

FIG. 1e schematically illustrates a sequence of steps for continuing the boot process after step 167 in FIG. 1d. In step 167A, the system memory 110 may be initialized and, in step 167B, the BIOS information 121, or at least the portion 121B, may be loaded into the system memory 110. In step 167C, the BIOS information 121, or at least the portion 121B, may be verified in the system memory 110, for instance, by calculating one or more respective hash values and comparing the values with the corresponding hash values contained in the portion 121A, which has been verified in step 166 (FIG. 1d). In step 167D, the process flow branches into step 167E, when the remaining portion of the boot information has not been verified, or into step 167F, when the boot process may be continued, for instance, by loading the operating system, as previously explained.

In the above-described embodiment, before passing execution to the boot information 121 or the portion 121A, the secure boot process, i.e., the process flow represented by the steps 161-166, may not apply any reset procedures to any components of the system 150, thereby enabling reliable "measurement" of the hardware configuration of the system 150.

Figure 1F:
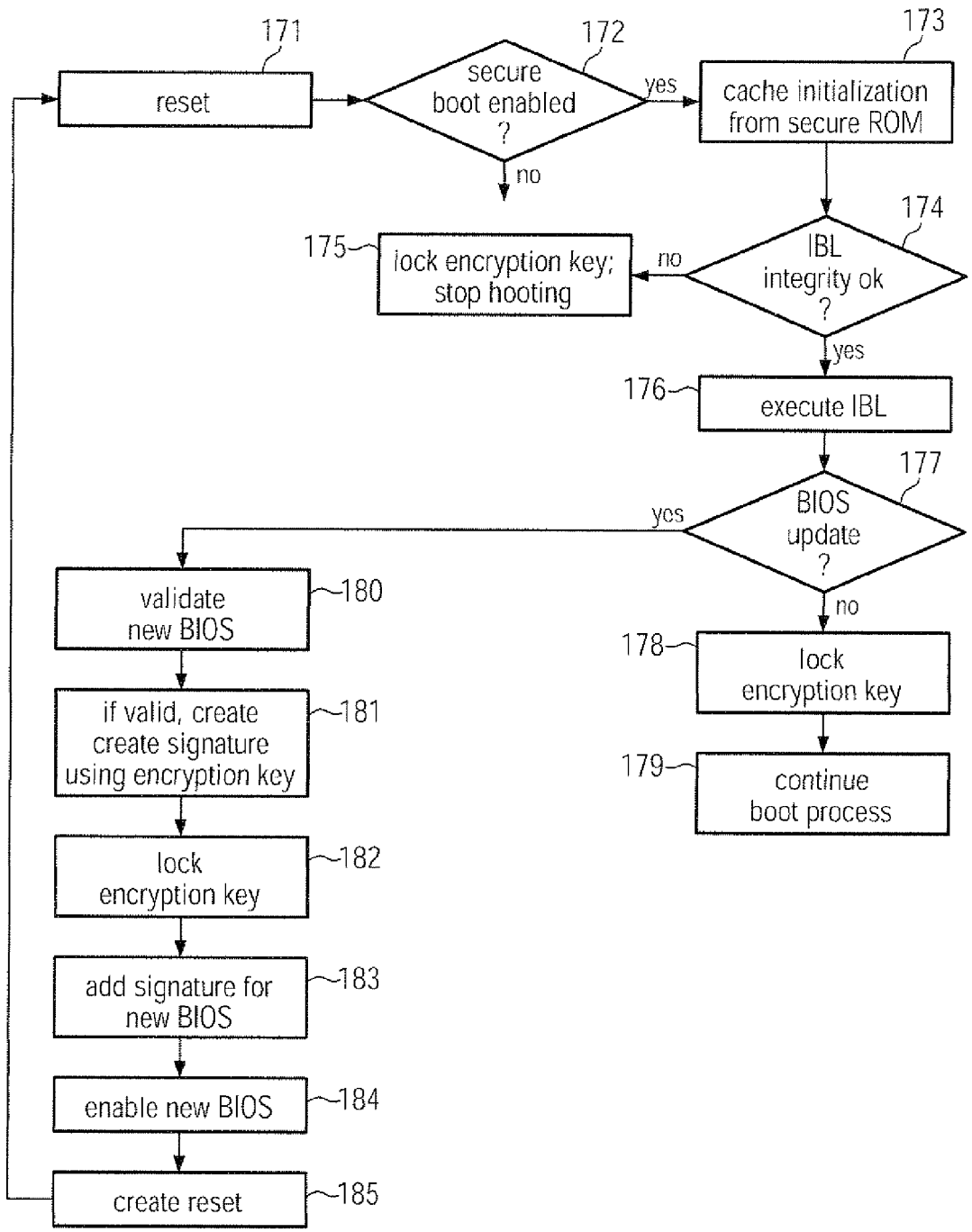
FIGS. 1f-1g schematically illustrate flow diagrams of methods for performing verification of BIOS integrity and updating the BIOS data, according to still other illustrative embodiments.

FIG. 1f schematically illustrates a flow diagram for representing the operation of the system 150 when updating of a BIOS information may be possible. In step 171, a reset event, such as power-on, may occur and the process flow may advance to step 172, in which it is determined whether the secure boot processing is enabled or not. If secure boot processing is not enabled, which may be advantageous during testing and debugging the system 150, an alternative process flow may be initiated. If secure boot processing is enabled, the process flow may advance to step 173 in which execution of instructions may be started by accessing the internal non-volatile memory 103 and performing instructions of the set 103A, as previously explained. In step 174, integrity of at least a portion of the boot information, such as the portion 121A, may be checked, for instance, in the same way as previously described with reference to the process flow in FIG. 1d. If integrity of the boot information 121A is not verified in step 174, the process may advance to step 175 in which the encryption key 103B may be locked and the boot process may be terminated or booting may be continued, however, with limited services provided by the system 150. If integrity is validated in step 174, execution of instructions of the boot information 121A may be started in step 176. In step 177, it may be determined whether or not updating of the BIOS information 121 may be required. For this purpose, for instance, the internal memory 110 may be accessed to determine whether or not a non-enabled version of BIOS information is available or not. If a respective updating of the BIOS information is not required, the process flow advances to step 178 in which the encryption key 103B is locked, as previously explained. Thereafter, in step 179, the boot processing may be continued, as previously explained. When, in step 177, updating of the BIOS information 121 is required, the process flow advances to step 180 in which the BIOS version contained in one of the memory areas 120A or 120B of the non-volatile memory 120 may be validated. For this purpose, any appropriate mechanism may be used, for instance, using an asymmetric encryption mechanism, on which, upon creating the BIOS version, respective hash sums may have been calculated and have been encrypted by a secret key, which may now be validated on the basis of a public key, which may be contained in the new BIOS information.

When, in step 181, a valid version of the new BIOS information is identified, a signature may be created by applying the encryption key 103B in that a respective hash sum may be calculated over the respective IBL portion of the new BIOS information, which may then be signed by applying the encryption key 103B. In step 182, the encryption key 103B may then be locked, as previously explained, and, in step 183, the signature generated in step 181 may be added to the new BIOS information, for instance to the respective IBL portion 121A, when the BIOS information is provided in several parts. In step 184, the new BIOS information may be enabled, that is, an indication may be stored in the non-volatile memory 103 or any other appropriate storage that the new BIOS version is a BIOS information to be used for performing the boot process. In step 185, a reset event is generated so that the process flow returns to step 171. Consequently, upon enabling the upgrade version of the BIOS information in step 184, the steps 172-177 may be repeated on the basis of the upgrading of the BIOS information and the boot processing may be performed on the basis of the new BIOS information.

Figure 1G:
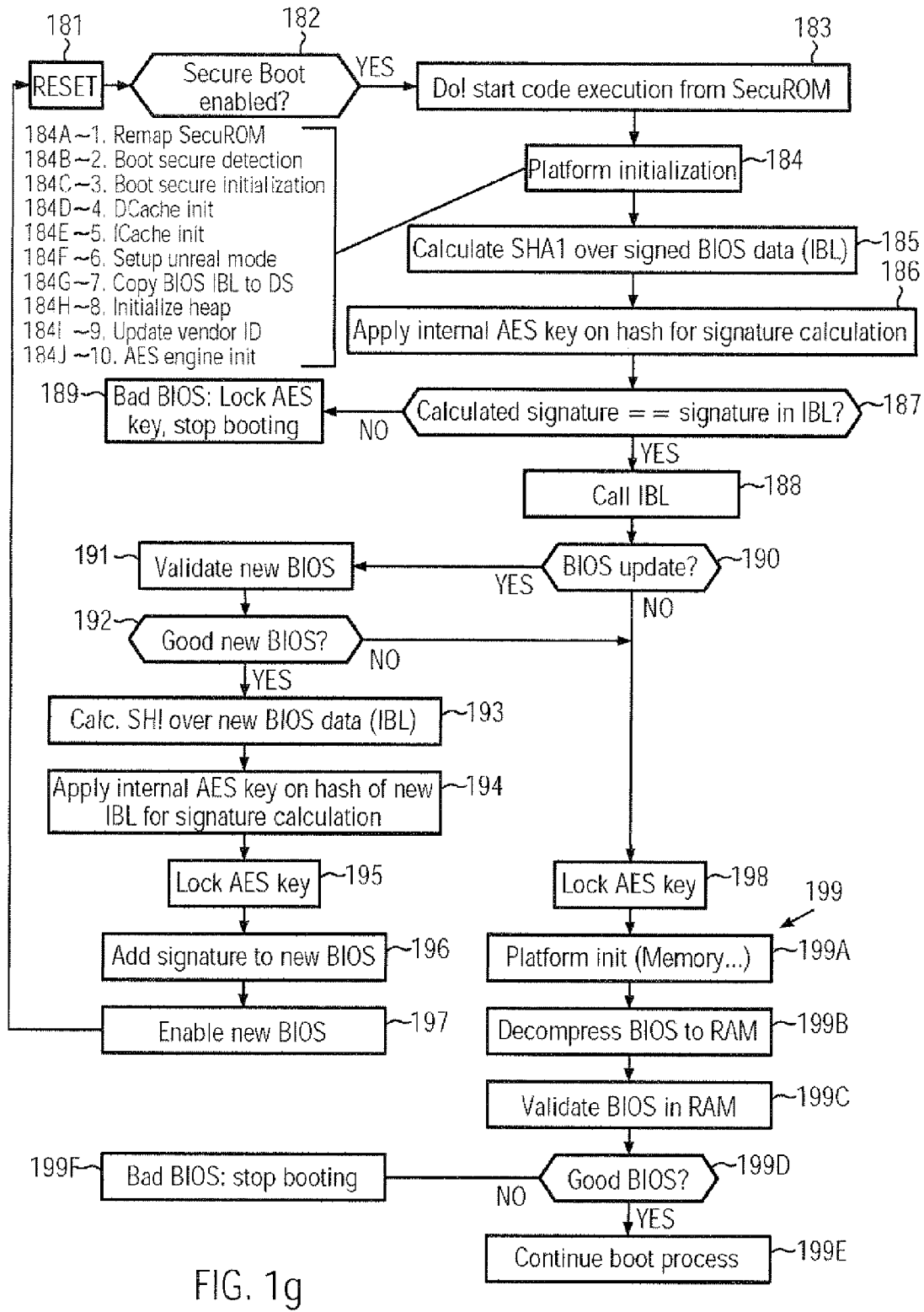

FIG. 1g schematically illustrates a secure boot processing according to still other illustrative embodiments. As shown, in steps 181 and 182, reset events may be detected and it may be determined whether or not secure boot is enabled, as also previously explained. In step 183, instruction execution is performed from the internal data set 103A. In step 184, a CPU internal initialization may take place. In some illustrative embodiments, this may include steps 184A-184J. For example, in step 184A, the memory 103 may be remapped. In step 184B, a boot source may be detected and may be initialized in step 184C, followed by initialization of the data cache 101A and the instruction cache 101B according to steps 184D, 184E. In step 184F, an unreal mode for the data cache may be set up and the image of the boot information 121 for the portion 121A may be copied into the data cache 101A, while, in step 184H, storage space may be assigned for variables in the data cache 101A. If required, in step 184I, vendor identification may be retrieved and, in step 184J, a respective encryption engine may be initialized. Thereafter, in step 185, the hash sum over the signed BIOS data 121A, that is, the IBL, may be calculated. In step 186, the internal encryption key 103B may be applied to a previously calculated hash sum to generate a signature. In step 187, the signature determined in step 186 may be compared with the signature contained in the signed BIOS information 121A. In step 189, the boot processing may be terminated if the signed BIOS information has been identified as an invalid information and the internal key 103B may be locked in step 189. In step 188, execution of the BIOS information may be started when a valid version of the BIOS information has been identified in step 187. In step 190, it may be determined whether updating of the BIOS information is required. If so, in step 191, the new BIOS information may be validated, for instance as previously indicated, and, in step 192, it may be decided whether or not the new BIOS information is valid information or not. If a valid BIOS version is detected in step 192, in step 193, a hash sum may be calculated over the new BIOS information, i.e., a respective portion thereof, such as an IBL portion, and, in step 194, the internal encryption key 103B may be applied to the hash value to generate a new signature. In step 195, the internal key used in step 194 may be locked and, in step 196, the newly created signature may be added to the new BIOS information. In step 197, the new BIOS information may be enabled, as also previously explained. If in step 192 the new BIOS information is identified as an invalid information or if in step 190 updating of the BIOS information is not required, the process flow advances to step 198, in which the encryption key 103B may be locked. Thereafter, the boot processing may continue in step 199 which, in some illustrative embodiments, may include the initialization of further system components of the system 150, such as the system memory 110 in step 199A. Thereafter, in step 199B, the BIOS information, as presently enabled, may be loaded into the system memory and, in step 199C, the BIOS information may be verified, for instance, by calculating respective hash sums and comparing the hash sums with the values contained in the BIOS information, as previously explained. If in step 199D the BIOS information is identified as valid information, the boot processing may be continued in step 199E, for instance by performing further steps for finally loading an operating system. If in step 199D the BIOS information is identified as an invalid BIOS information, in step 199F, the boot process may be terminated or an indication may be given and the services of the system 150 may be enabled in a restricted form, as previously explained.

As a result, the systems and mechanisms disclosed herein provide enhanced integrity of computer platforms by providing a secure boot processing on the basis of a pre-boot routine contained in a non-volatile memory and a symmetric encryption key. Since the non-volatile memory is a part of the CPU itself, system initialization may be accomplished on the basis of the pre-boot information stored in the non-volatile internal memory and verification of the boot information may be accomplished by using the symmetric encryption key. Thus, enhanced security of the platform may be accomplished without requiring a trust center, wherein an efficient protection against class breaks may be obtained, while the degree of security may be determined on the basis of the granularity of the symmetric encryption key, which may be incorporated into the non-volatile memory during fabrication of the CPU device.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for booting a computer system, the method comprising:
   upon one of a power-on and a reset event, executing instructions stored in an internal non-volatile memory area of a central processing unit, said internal non-volatile memory area containing an encryption key;
   determining a current signature of at least a signed portion of boot data, said signed portion of boot data containing a stored signature of said portion of boot data, said stored signature created by applying said encryption key; and
   executing boot instructions contained in said signed portion of boot data, when said current signature and said stored signature are identical.

2. The method of claim 1, wherein executing said instructions stored in said internal non-volatile memory area comprises initializing an internal random access memory of said central processing unit and loading said at least a portion of boot data from a non-volatile memory into said initialized random access memory.

3. The method of claim 2, wherein executing boot instructions of said signed portion of boot data comprises initializing a system memory of said computer system and loading said boot data from said non-volatile memory into said system memory and verifying an integrity of said boot data.

4. The method of claim 2, wherein initializing said internal random access memory comprises initializing a data cache and an instruction cache of said central processing unit and wherein said at least a portion of boot data is loaded into said data cache.

5. The method of claim 1, further comprising locking said encryption key for external access prior to executing said boot instructions.

6. The method of claim 5, further comprising determining whether an upgrade version of said boot data is available.

7. A method for booting a computer system, the method comprising:
upon one of a power-on and a reset event, executing instructions stored in an internal non-volatile memory area of a central processing unit, said internal non-volatile memory area containing an encryption key;
determining a current signature of at least a signed portion of boot data, said signed portion of boot data containing a stored signature of said portion of boot data, said stored signature created by applying said encryption key;
locking said encryption key for external access prior to executing said boot instructions;
determining whether an upgrade version of said boot data is available, wherein determining whether an upgrade version of said boot data is available is performed prior to locking said encryption key; and
executing boot instructions contained in said signed portion of boot data, when said current signature and said stored signature are identical.

8. The method of claim 7, further comprising verifying said upgrade version of said boot data.

9. The method of claim 8, further comprising calculating a new signature over a hash sum of said upgrade version of the boot data using said encryption key and adding said new signature to said upgrade version of the boot data.

10. The method of claim 9, further comprising enabling said upgrade version of said boot data.

11. The method of claim 10, further comprising generating a reset event.

12. The method of claim 10, further comprising locking said encryption key prior to enabling said upgrade version of the boot data.

13. A method for booting a computer system, the method comprising:
upon at least one of a power-up event and a reset event, accessing an internal non-volatile memory of a central processing unit, said internal non-volatile memory containing pre-boot instructions and data values for initializing an internal volatile memory of said central processing unit and verifying an integrity of at least a portion of boot instructions and boot data values;
loading said at least a portion of said boot instructions and boot data values from a non-volatile memory into said internal volatile memory by executing said pre-boot instructions;
verifying integrity of said at least a portion of said boot instructions and boot data values by using an encryption key stored in said internal non-volatile memory and a signature associated with said at least a portion of said boot instructions and boot data values, said signature being formed on the basis of said encryption key;
after successfully verifying integrity of said at least a portion of said boot instructions and boot data values, determining whether an upgrade version of said boot instructions and boot data values is available; and
when an upgrade version is available, generating a signature of said upgrade version by using said encryption key.

14. The method of claim 13, wherein executing said boot instructions comprises initializing a system memory of said computer system and loading a second portion of boot instructions and boot data values into said system memory.

15. The method of claim 14, further comprising verifying integrity of said second portion and continuing booting of said computer system on the basis of said second portion when verification of said second portion is successful.

16. The method of claim 13, wherein initializing said volatile internal memory comprises initializing a data cache of said central processing unit and wherein said at least a portion is loaded into said data cache and is verified therein.

17. The method of claim 13, further comprising locking said encryption key prior to executing said boot instructions when an upgrade version is not available.

18. The method of claim 13, further comprising verifying said upgrade version of the boot instructions and boot data prior to generating said new signature.

19. A central processing unit (CPU), comprising:
a substrate having formed thereon circuit elements defining a CPU core, a volatile random access memory, a non-volatile memory and a bus system for connecting said CPU core, said volatile random access memory and said non-volatile memory; and
pre-boot information stored in said non-volatile memory, said pre-boot information including instructions executable by said CPU core and a symmetric encryption key for verifying at least a portion of a boot routine signed by using said symmetric encryption key.

20. The central processing unit of claim 19, further comprising a locking mechanism configured to enable a portion of said non-volatile memory containing said symmetric encryption key upon one of a reset event and a power-on event only.

21. A computer system, comprising:
a central processing unit comprising:
a substrate having formed thereon circuit elements defining a CPU core, a volatile random access memory, a non-volatile memory and a bus system for connecting said CPU core, said volatile random access memory and said non-volatile memory, and
pre-boot information stored in said non-volatile memory, said pre-boot information including instructions executable by said CPU core and a symmetric encryption key for verifying at least a portion of a boot routine signed by using said symmetric encryption key; and
a non-volatile boot memory configured to hold at least said boot routine and a second boot routine.

* * * * *